(12) United States Patent
Kasuya et al.

(10) Patent No.: US 7,727,099 B2
(45) Date of Patent: Jun. 1, 2010

(54) VEHICLE DRIVING DEVICE

(75) Inventors: Satoru Kasuya, Hazu-cho (JP); Masashi Kito, Anjo (JP); Atsushi Tabata, Okazaki (JP); Takuma Kakinami, Toyota (JP); Masahiro Kojima, Okazaki (JP); Ryuji Ibaraki, Nishikamo-gun (JP); Yuji Iwase, Mishima (JP)

(73) Assignee: Aisin AW Co., Ltd., Anjo (JP)

( * ) Notice: Subject to any disclaimer, the term of this patent is extended or adjusted under 35 U.S.C. 154(b) by 567 days.

(21) Appl. No.: 11/714,725

(22) Filed: Mar. 7, 2007

(65) Prior Publication Data

US 2007/0265129 A1    Nov. 15, 2007

(30) Foreign Application Priority Data

Mar. 23, 2006    (JP) .............................. 2006-080794

(51) Int. Cl.
*F16H 3/72*    (2006.01)
(52) U.S. Cl. ........................... 475/5; 903/952; 74/606 R
(58) Field of Classification Search ........................ None
See application file for complete search history.

(56) References Cited

U.S. PATENT DOCUMENTS

RE33,707 E * 10/1991 Shindo et al. ................. 475/59

| 2002/0077209 A1 | 6/2002 | El-Antably et al. |
| 2005/0037883 A1 | 2/2005 | Motoike et al. |
| 2005/0115750 A1 | 6/2005 | Takami et al. |
| 2005/0124457 A1 | 6/2005 | Nakamori et al. |

FOREIGN PATENT DOCUMENTS

| DE | 197 39 906 A1 | 3/1999 |
| FR | 2 814 121 A1 | 3/2002 |
| JP | A-2-275149 | 11/1990 |
| JP | A-2004-353780 | 12/2004 |
| JP | A 2004-353782 | 12/2004 |
| JP | A-2005-162002 | 6/2005 |
| JP | A-2005-212494 | 8/2005 |

* cited by examiner

*Primary Examiner*—David D Le
*Assistant Examiner*—Erin D Bishop
(74) *Attorney, Agent, or Firm*—Oliff & Berridge, PLC

(57) ABSTRACT

A vehicle driving device includes a case with a case body; a transmission mechanism having hydraulically controlled frictional engaging devices; an electric motor housed in the case body; and a hydraulic controller that controls oil pressure supplied to the frictional engaging devices, with the hydraulic controller disposed on an outer wall of the case body. The case body has an opening at one end of the case body that is structured to allow the transmission mechanism and the electric motor to be inserted through the opening, and an end wall portion, having a bearing part that supports an output shaft of the transmission mechanism, that is provided at another end of the case body integrally with the case body.

24 Claims, 4 Drawing Sheets

VEHICLE DRIVING DEVICE

INCORPORATION BY REFERENCE

The disclosure of Japanese Patent Application No. 2006-080794 filed on Mar. 23, 2006, including the specification, drawings, and abstract, is incorporated herein by reference in its entirety.

BACKGROUND

The present invention relates to a vehicle driving device.

Japanese Patent Application Publication No. JP-A-2004-353782 discloses a vehicle driving device, illustrated by FIG. 4, that includes a transmission mechanism and an electric motor. FIG. 4 is a side sectional view of a vehicle driving device 51 described in Japanese Patent Application Publication No. JP-A-2004-353782. The vehicle driving device 51 includes a damper device 53, a first motor generator 54, a power transfer mechanism 55 that includes a planetary gear mechanism, a second motor generator 56, and a transmission mechanism 57 that are sequentially disposed on an extension of a crank shaft 52 of an engine (not shown) and housed in a case 58. The transmission mechanism 57 includes a planetary gear mechanism with two brakes 57a and 57b for switching the transmission gear ratio by regulating the rotation of any element of the mechanism.

The case 58 includes a first case body 58a, a second case body 58b, and an end cover 58c that are listed in the order of their closeness to the crank shaft 52. The second case body 58b is formed integrally with an intermediate wall portion 59 extending inwardly in the radial direction of the second case body 58b from an inner circumferential wall thereof, and the second case body 58b is configured to have two parts partitioned by the intermediate wall portion 59. The second motor generator 56 is mounted in the second case body 58b by inserting it from one end (the left end in FIG. 4) of the second case body 58b in the axial direction thereof, and the transmission mechanism 57 is mounted in the second case body 58b by inserting it from the other end (the right end in FIG. 4) of the second case body 58b in the axial direction thereof. The end cover 58c is mounted on the other end of the second case body 58b such that it covers the transmission mechanism 57 mounted in the second case body 58b. Thus, an input shaft 57c of the transmission mechanism 57 is supported by a bearing part 59a provided on the intermediate wall portion 59, and an output shaft 57d of the same is supported by a bearing part 58c1 provided on the end cover 58c. The first case body 58a is mounted on a front side of the second case body 58b. The damper device 53, the first motor generator 54, and the power transfer mechanism 55 are mounted in the first body case 58a.

An oil pan 60 and a hydraulic controller 61 are mounted on an outer wall of the second case body 58b on the bottom side thereof. The oil pan 60 has an axial length extending from the neighborhood of the one end of the second case body 58b to the neighborhood of the other end in accordance with the entire length of the second case body 58b, and the oil pan 60 is mounted to cover a substantial part of the bottom side of the second case body 58b. The hydraulic controller 61 is disposed in an oil chamber 62 surrounded by the oil pan 60 and an outer wall of the case 58. The hydraulic controller 61 supplies oil supplied from an oil pump 63 to the motor generators 54 and 56, the transmission mechanism 57, and so on to cool and lubricate them or to disengage and engage the brakes 57a and 57b through switching of each valve incorporated therein.

SUMMARY

In the above-described vehicle driving device 51, it is difficult to maintain oil-tightness with oil seals when the oil pan 60 and the hydraulic controller 61 are disposed across the boundary between the second case body 58b and the first case body 58a and the boundary between the second case body 58b and the end cover 58c. Specifically, when the oil pan 60 is disposed across such boundaries, there will be regions where an oil seal between the oil pan 60 and the first case body 58a, the second case body 58b, and the end cover 58c intersects with oil seals between the second case body 58b and the first case body 58a and between the second case body 58b and the end cover 58c, and it will be difficult to maintain oil-tightness in such regions. Therefore, the entire length of the space for disposing the oil pan 60 and the hydraulic controller 61 in the axial direction is limited to being equal to or less than a maximum that includes the entire axial length of the second case body 58b. As a result, when the size of the hydraulic controller 61 must be increased, for reasons such as a need for exercising complicated hydraulic control by providing the transmission mechanism 57 with multiple stages, it may be difficult to accommodate a space to dispose the hydraulic controller 61. Further, there is a need to increase the capacity of the oil pan 60 in order to keep the supply of oil to the hydraulic controller 61 stable even when the distribution of the oil in the oil pan 60 becomes uneven at the time of acceleration or deceleration of the vehicle.

The invention thus provides, among other things, a vehicle driving device in which a sufficient space can be accommodated to dispose a hydraulic controller and in which an oil pan can be provided with a sufficient capacity.

A vehicle driving device according to an exemplary aspect of the invention includes a case with a case body; a transmission mechanism having hydraulically controlled frictional engaging devices; an electric motor housed in the case body; and a hydraulic controller that controls oil pressure supplied to the frictional engaging devices, with the hydraulic controller disposed on an outer wall of the case body, wherein the case body has an opening at one end of the case body that is structured to allow the transmission mechanism and the electric motor to be inserted through the opening, and an end wall portion, having a bearing part that supports an output shaft of the transmission mechanism, that is provided at another end of the case body integrally with the case body.

A method of forming a vehicle driving device according to another exemplary aspect of the invention includes mounting a transmission mechanism to a case body by inserting the transmission mechanism from an opening at one end of the case body; mounting an intermediate wall body that supports an input shaft, after mounting the transmission mechanism to the case body, by inserting the intermediate wall body from the opening at the one end of the case body; and mounting an electric motor, after mounting the intermediate wall body, to the case body by inserting the electric motor from the opening at the one end of the case body.

BRIEF DESCRIPTION OF THE DRAWINGS

Various exemplary aspects of the invention will be described with reference to the drawings, wherein.

DETAILED DESCRIPTION OF EMBODIMENTS

A mode for carrying out the invention will now be described based on the drawings. The present mode for carrying out the invention will be described by referring to an exemplary vehicle driving device 1 which is a hybrid vehicle driving device receiving the input of a driving force generated by an engine E and two motor generators MG1 and MG2 serving as electric motors.

Figure 1:
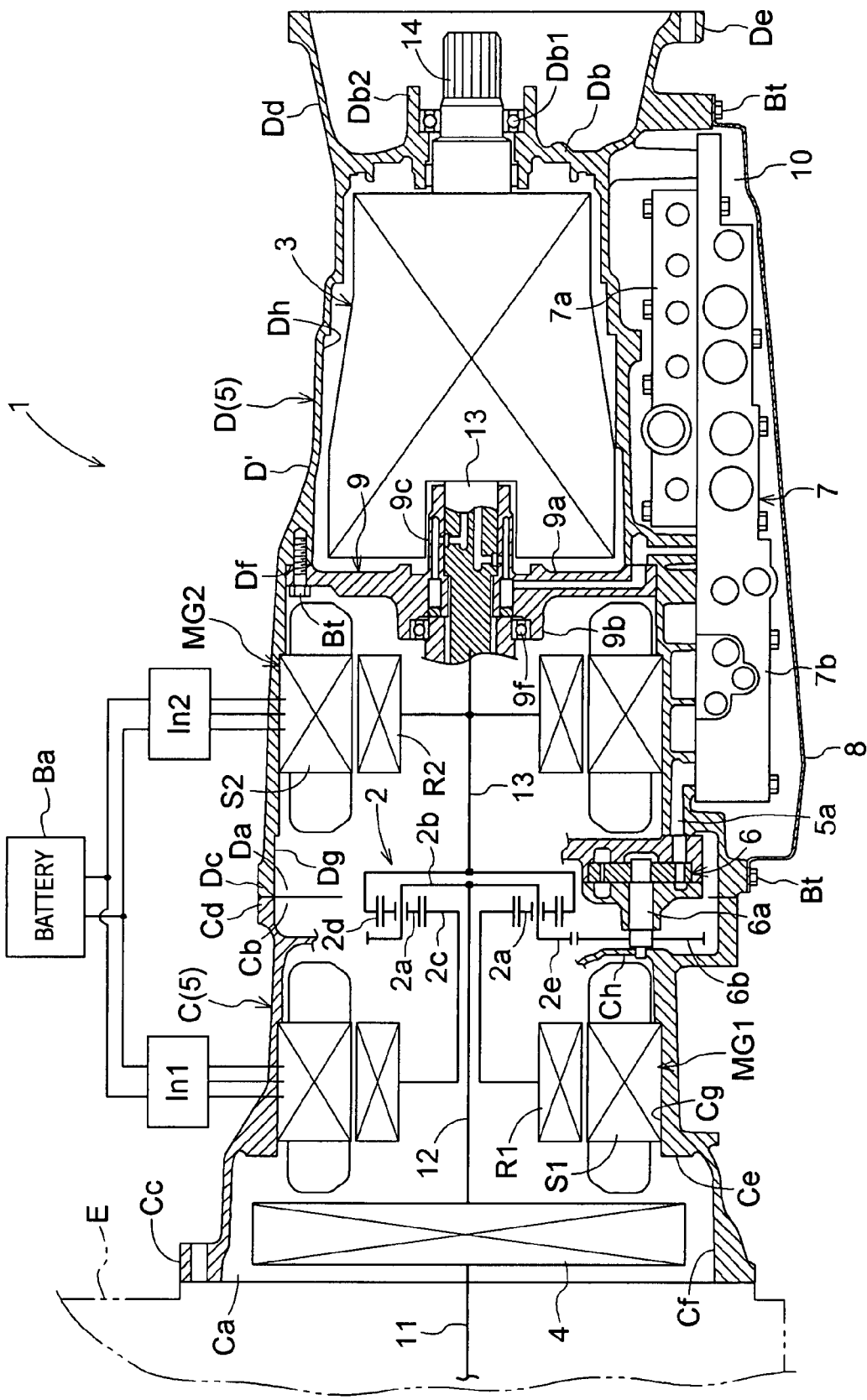
FIG. 1 is a sectional view showing a general configuration of a vehicle driving device.
Figure 2:
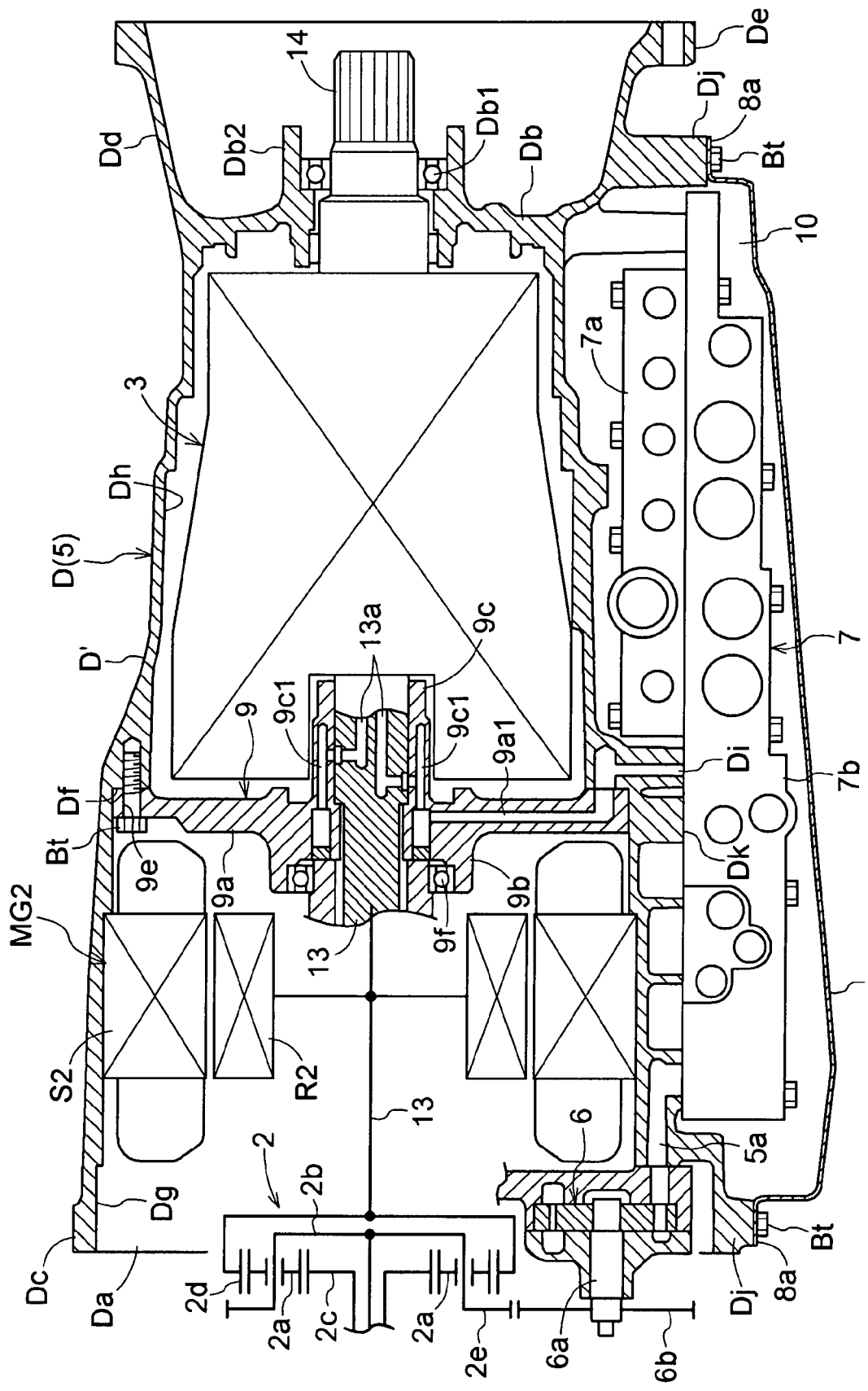
FIG. 2 is an enlarged view of major parts in FIG. 1.

FIG. 1 is a sectional view showing a general configuration of the vehicle driving device 1; and FIG. 2 is an enlarged view of major parts of FIG. 1. In those figures, the first motor generator MG1, the second motor generator MG2, a power transfer mechanism 2, and a transmission mechanism 3 are schematically shown. The engine E, a battery Ba, and inverters In1 and In2 connected to the vehicle driving device 1 are also schematically shown.

1. General Configuration

As shown in FIG. 1, the vehicle driving device 1 includes the first motor generator MG1, the second motor generator MG2, the power transfer mechanism 2, and the transmission mechanism 3 as major features. The vehicle driving device 1 is configured as a split system in which a driving force transferred from the engine E through a damper device 4 is distributed to the first motor generator MG1 and the combination of the second motor generator MG2 and the transmission mechanism 3. Those features are housed in a cylindrical driving apparatus case 5 extending in the front-to-rear direction formed by combining a first case body C and a second case body D. Specifically, the first motor generator MG1, the power transfer mechanism 2, the second motor generator MG2, and the transmission mechanism 3 are disposed and housed in the order listed from the side of the engine E toward the side of an output shaft 14. The vehicle driving device 1 includes a hydraulic controller 7 for exercising control for supplying oil supplied from an oil pump 6 to each part of the vehicle driving device 1 and an oil pan 8 for storing the oil, provided under an outer wall of the second case body D. The output shaft 14 of the vehicle driving device 1 transmits a driving force to the wheels through a differential device, a transfer device or the like for four wheel driving (not shown).

A configuration of each part of the vehicle driving device 1 will now be described in detail. In the description of the present mode for carrying out the invention, the side of a crank shaft 11 which is driven by the engine E will be referred to as "front side" (left side in FIG. 1), and the side of the output shaft 14 will be referred to as "rear side" (right side in FIG. 1).

2. Internal Configuration

In the vehicle driving device 1, an input shaft 12, an intermediate shaft 13, and the output shaft 14 are disposed in a row in the order listed from the front side of the apparatus. The damper device 4 is provided between the crank shaft 11 and the input shaft 12. The damper device 4 is a device for performing transmission from the crank shaft 11 to the input shaft 12 while damping vibration in the rotating direction. A rear end of the input shaft 12 is coupled to a carrier 2b of the power transfer mechanism 2. A configuration excluding the damper device 4 may be employed.

The power transfer mechanism 2 includes a single pinion type planetary gear mechanism which is disposed coaxially with the input shaft 12. Specifically, the power transfer mechanism 2 includes the carrier 2b supporting a plurality of pinion gears 2a, and a sun gear 2c and a ring gear 2d each of which is engaged with the pinion gears 2a. The carrier 2b of the power transfer mechanism 2 is coupled to the input shaft 12. The sun gear 2c is coupled to a rotor R1 of the first motor generator MG1. The ring gear 2d is coupled to the intermediate shaft 13. Thus, the power transfer mechanism 2 distributes a driving force transmitted from the engine E through the input shaft 12 to the carrier 2b to the side of the first motor generator MG1 and to the side of the intermediate shaft 13 through a control exercised over the rotation of the first motor generator MG1. The driving force distributed to the first motor generator MG1 is primarily used for generating electrical power, and the driving force distributed to the intermediate shaft 13 is primarily used for driving the vehicle.

The first motor generator MG1 includes a stator S1, which is secured to the first case body C, and the rotor R1, which is rotatably supported inside the stator S1 when viewing the radial direction of the stator S1. The rotor R1 of the first motor generator MG1 is coupled to the sun gear 2c of the power transfer mechanism 2. The first motor generator MG1 is connected to the battery Ba through the inverter In1 and is further connected to the second motor generator MG2 through the inverter In2. The first motor generator MG1 primarily generates electrical power from the driving force that is input through the sun gear 2c to charge the battery Ba serving as an accumulator or to drive the second motor generator MG2.

The second motor generator MG2 includes a stator S2, which is secured to the second case body D, and a rotor R2, which is rotatably supported inside the stator S2 when viewing the radial direction of the stator S2. The rotor R2 of the second motor generator MG2 is coupled to the intermediate shaft 13. The intermediate shaft 13 is coupled to the ring gear 2d of the power transfer mechanism 2 and the transmission mechanism 3. The second motor generator MG2 is connected to the battery Ba through the inverter In2 and is further connected to the first motor generator MG1 through the inverter In1. The second motor generator MG2 primarily serves as a driving motor for assisting the driving force for driving the vehicle. However, it serves as a generator at the time of deceleration of the vehicle or the like to regenerate an inertial force of the vehicle as electrical energy.

The transmission mechanism 3 includes a combination of a set of planetary gear mechanisms or plural sets of planetary gear mechanisms. Therefore, the transmission mechanism 3 includes a carrier supporting a plurality of pinion gears, a sun gear, and a ring gear as constituent elements thereof. The transmission mechanism 3 includes brakes for regulating or allowing the rotation of each of the elements of the planetary gear mechanisms constituting the same and a plurality of frictional engaging devices including clutches for coupling the plurality of elements. Each of the frictional engaging devices is engaged or disengaged by a hydraulic servo, which is not shown, operated by oil supplied from the oil pump 6 through the hydraulic controller 7. A plurality of shift gears having different gear ratios of the transmission mechanism 3 can be switched through engagement or disengagement of each of the frictional engaging devices. The input side of the transmission mechanism 3 is coupled to the intermediate shaft 13, and the output side of the same is coupled to the output shaft 14. In the present mode for carrying out the invention, the intermediate shaft 13 corresponds to an input shaft of the transmission mechanism 3, and the output shaft 14 corresponds to an output shaft of the transmission mechanism 3.

3. Configuration of Driving Apparatus Case 5

The driving apparatus case 5 comprises the first case body C and the second case body D which is mounted on the rear side of the first case body C integrally with the same. The damper device 4 and the first motor generator MG1 are housed in the first case body C. The second motor generator MG2 and the transmission mechanism 3 are housed in the second case body D. The power transfer mechanism 2 and the oil pump 6 are housed in the vicinity of the junction between the first case body C and the second case body D. The hydraulic controller 7 and the oil pan 8 are mounted under an outer wall of the second case body D. In the present mode for carrying out the invention, the second case body D corresponds to the "case body" as set forth in the claims of the present application. The front side of the second case body D (the left side in FIGS. 1 and 2) corresponds to "the side of one end" as set forth in the claims of the present application, and the rear side of the second case body D (the right side in FIGS. 1 and 2) corresponds to "the side of another end) as set forth in the claims of the present application.

The first case body C is substantially formed in a double-cylindrical shape, and the first case body C has a front end opening Ca at the front end thereof that is structured to allow the first motor generator MG1 and the damper device 4 to be inserted. The first case body C also has an opening at the rear end thereof, i.e., a rear end opening Cb. The first case body C includes a front end mounting portion Cc in the form of a flange provided around the front end opening Ca to mount the same to the rear end of the engine E and a rear end coupling portion Cd provided around the rear end opening Cb to couple the same to the second case body D. A step portion Ce is formed on an inner wall of the first case body C in an intermediate region thereof when viewed in the front-to-rear direction (axial direction) of the same. The front side of the step portion Ce includes a large-diameter part Cf formed in a substantially cylindrical shape, and the rear side of the step portion Ce includes a small-diameter part Cg formed in a substantially cylindrical shape having a diameter smaller than that of the large-diameter part Cf. The damper device 4 is housed inside the large diameter part Cf. The first motor generator MG1 is housed with the stator S1 of the first motor generator MG1 secured on an inner wall of the small-diameter part Cg. A bearing part Ch for holding a front end part of a rotary shaft 6a of the oil pump 6 is provided in a lower part on the rear side of the small-diameter part Cg. Although not described in detail, the securing structure for securing the stator S1 of the first motor generator MG1 on the inner wall of the first case body C is the same as the securing structure for securing the stator S2 of the second motor generator MG2 on an inner wall of the second case body D (see FIG. 3), which is described later.

The second case body D will now be described primarily using FIG. 2. The second case body D has a front end opening Da portion provided at a front end of a substantially double-cylindrical second case body portion D' to allow the transmission mechanism 3 and the second motor generator MG2 to be inserted. The second case body D also includes an integrally formed rear end wall portion Db having a bearing part Db1 for supporting the output shaft 14 of the transmission mechanism 3 provided on the side of a rear end of the second case body portion D' integrally with the second case body portion D'. The rear end wall portion Db is in the form of a wall extending from an inner circumferential wall of the rear end of the second case body portion D' inwardly in the radial direction thereof. A boss part Db2 is formed near the center of the read end wall portion Db in the radial direction thereof, and a bearing fitted with the boss part Db2 to be supported thereby includes the bearing part Db1 for supporting the output shaft 14. In the present mode for carrying out the invention, the front end opening Da corresponds to "the opening on the one end" as set forth in the claims of the present application, and the rear end wall portion Db corresponds to the "the opening on another end" as set forth in the claims of the present application.

The second case body D includes a front end coupling portion Dc provided around the front end opening Da for coupling the same to the first case body C. Further, the second case body D includes an extending portion Dd in the form of a substantially conical cylinder extending further rearward from the rear end wall portion Db, and it also includes a rear end mounting portion De provided by forming the end of the extending portion Dd like a flange. The rear end mounting portion De is a part for mounting a transfer device, which is not shown, disposed on the rear side of the vehicle driving device 1.

A step portion Df is formed on an inner wall of the second case body D in an intermediate region thereof when viewed in the front-to-rear direction (axial direction) thereof. The front side of the step portion Df includes a large-diameter part Dg formed in a substantially cylindrical shape, and the rear side of the step portion Df includes a small-diameter part Dh formed in a substantially cylindrical shape having a diameter smaller than that of the large-diameter part Dg. In the present example, the small-diameter part Dh is formed as a stepped cylinder whose diameter decreases stepwise such that the part is tapered in diameter toward the rear side. The transmission mechanism 3 is housed in a space which is located inside the small-diameter part Dh in the radial direction thereof and on the front side of the rear end wall portion Db.

An intermediate wall body 9 having a bearing portion 9f for supporting the intermediate shaft 13 serving as the input shaft of the transmission mechanism 3 is secured inside the second case body D and frontward with respect to the transmission mechanism 3. The intermediate wall body 9 is secured by being made to abut on a side surface of the step portion Df having a small diameter on the rear side thereof from the front side (the side of the large-diameter part Dg). Therefore, the transmission mechanism 3 is housed in a space which is located inside the small diameter part Dh of the second case body D in the radial direction thereof and between the rear end wall portion Db and the intermediate wall body 9. At this time, the output shaft 14 and the input shaft (intermediate shaft 13) of the transmission mechanism 3 are supported by the bearing part Db1 of the rear end wall portion Db and the bearing part 9f of the intermediate wall body 9, respectively. The stator S2 of the second motor generator MG2 is secured on an inner wall of the large-diameter part Dg. Therefore, the second motor generator MG2 is disposed in the second case body D and frontward with respect to the intermediate wall body 9. The structure for securing the stator S2 of the second motor generator MG2 will be described later in detail using FIG. 3.

The transmission mechanism 3 has a diameter smaller than that of the second motor generator MG2. Accordingly, the second case body D houses the transmission mechanism 3 in the small-diameter part Dh and rearward with respect to the intermediate wall body 9 and houses the second motor generator MG2 in the large-diameter part Dg and frontward with respect to the intermediate wall body 9. The second case body portion D' of the second case body D is formed such that the outer diameter of the small-diameter part Dh located rearward with respect to the intermediate wall body 9 is smaller than the outer diameter of the large diameter part Dg located frontward with respect to the intermediate wall body 9.

The intermediate wall body 9 comprises a substantially disc-shaped body portion 9a, a boss portion 9b protruding frontward from the neighborhood of the center of the body portion 9a in the radial direction thereof, and a cylindrical portion 9c protruding rearward from the neighborhood of the center of the body portion 9a in the radial direction thereof. The body portion 9a is formed in a substantially disc-like shape having substantially the same outline as the inner diameter of the large-diameter part Dg on the front side of the step portion Df, and a bolt insertion hole 9e is provided on the outer circumference of the same. A bolt Bt as a fastening member inserted into the bolt insertion hole 9e from the front side engages a female screw part formed on the step portion Df with the body portion 9a abutting on a side surface of the step portion Df from the front side. Thus, the intermediate wall body 9 is secured in the second case body D.

A radial oil channel 9a1 allowing oil supplied from the hydraulic controller 7 to flow is formed in the body portion 9a to extend in the radial direction thereof. A bearing is fitted to the inner circumference of the boss portion 9b, and the bearing includes the bearing portion 9f for supporting the intermediate shaft 13. An axial oil channel 9c1 allowing the oil supplied from the hydraulic controller 7 to flow is formed in the cylindrical portion 9c to extend in the axial direction thereof. The axial oil channel 9c1 is connected to the radial oil channel 9a1 to be in communication with the same. Instead of the bearing at the boss portion 9b, another type of shaft bearing such as a bush may be provided.

Figure 3:
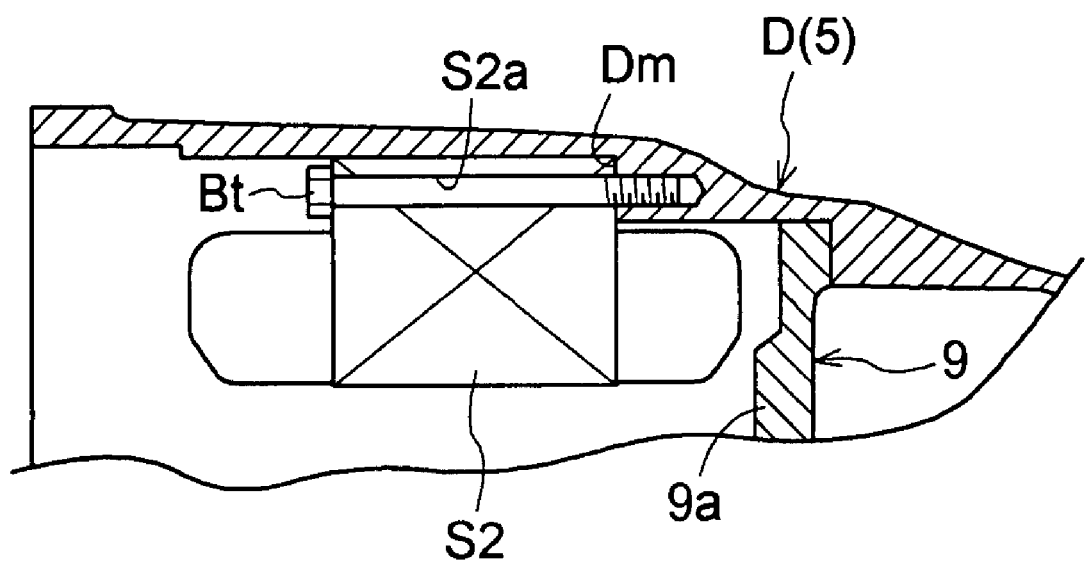
FIG. 3 is an enlarged view of major parts of the vehicle driving device taken on a section different from that in FIGS. 1 and 2.

FIG. 3 is an enlarged view of major parts of the vehicle driving device 1 in the present mode for carrying out the invention taken on a section different from that in FIGS. 1 and 2. FIG. 3 shows a structure for securing the stator S2 of the second motor generator MG2. As shown in the figure, a stator securing step portion Dm is formed frontward of the step portion Df on the inner wall of the large-diameter part Dg of the second case body D. The stator securing step portion Dm is formed in a plurality of locations in the circumferential direction so as to partially bulge outward in the radial direction, and the diameter of the portion is smaller on the rear side thereof than on the front side (the side of the front end opening Da).

The stator S2 of the second motor generator MG2 is secured by being made to abut on a side surface of the stator securing step portion Dm (a surface thereof facing frontward) from the front side. Specifically, bolt insertion holes S2a are provided in partial regions radially and outwardly bulging in a plurality of locations on the outer circumference of the stator S2 of the second motor generator MG2. Bolts Bt as fastening members inserted into the bolt insertion holes S2a from the front side engage female screw parts formed on the stator securing step portion Dm with the outer circumference of the stator S2 abutting on the stator securing step portion Dm from the front side. Thus, the stator S2 is secured in the second case body D.

The transmission mechanism 3, the intermediate wall body 9, and the second motor generator MG2 are mounted in the order listed in the second case body D having the above-described configuration by inserting them from the front end opening Da of the second case body D. The second case body D is formed to have an inner diameter which is tapered rearward and inversely tapered frontward. Therefore, a region of the second case body D is formed with a greater inner diameter at the front. The configuration therefore allows ease of the mounting operation to be maintained.

4. Configurations of Hydraulic Controller 7 and Oil Pan 8

The oil pan 8 is mounted under an outer wall of the second case body D. The hydraulic controller 7 is disposed in an oil chamber 10 surrounded by the oil pan 8 and the outer wall of the second case body D. The hydraulic controller 7 is also referred to as a valve body, and it includes a plurality of electromagnetically controlled valves. The hydraulic controller 7 operates the electromagnetically controlled valves to exercise control to enable or disable communication through an oil channel connecting each part of the vehicle driving device 1 and the oil pump 6. Thus, the hydraulic controller 7 supplies pressure oil from the oil pump 6 to each part of the first motor generator MG1, the second motor generator MG2, the transmission mechanism 3, and so on to perform cooling or lubrication. The hydraulic controller 7 also exercises control to enable or disable the supply of oil pressure from the oil pump 6, whereby operation control is exercised to engage and disengage the frictional engaging devices of the transmission mechanism 3 that includes brakes and clutches. The oil pump 6 is disposed lower in the second case body D and frontward with respect to the second motor generator MG2. The illustrated oil pump 6 includes a mechanical trochoidal pump which is driven by the driving force from the engine E. A driven gear 6b of the oil pump 6 is provided such that it engages a driving gear 2e rotating integrally with the carrier 2b of the power transfer mechanism 2. The oil pump 6 and the hydraulic controller 7 communicate through an oil channel 5a provided at the front end of the body portion D' of the second case body D. Although not shown, a configuration including an electric oil pump may be preferably employed to allow pressure oil to be supplied to the hydraulic controller 7 when the engine E is stopped.

As described above, the radial oil channel 9a1 and the axial oil channel 9c1 in communication with the hydraulic controller 7 are formed in the intermediate wall body 9. As shown in FIG. 2, the radial oil channel 9a1 is in communication with the hydraulic controller 7 through an oil channel Di provided at the step portion Df of the second case body D. The axial oil channel 9c1 in communication with the radial oil channel 9a1 is configured to have an open oil channel on the inner side thereof when viewed in the radial direction to allow oil from the hydraulic controller 7 to be supplied to an oil channel 13a provided in the intermediate shaft 13 inserted into the inner side of the cylindrical portion 9c in the radial direction thereof. The oil is supplied to each part of the transmission mechanism 3, the second motor generator MG2, and so on. A plurality of the radial oil channels 9a1 and the axial oil channels 9c1 of the intermediate wall body 9 are provided to supply the oil to respective parts of the vehicle driving device 1.

The oil pan 8 is mounted on a bottom surface of the outer wall of the second case body D. To allow the oil pan 8 to be mounted, the bottom surface of the outer wall of the second case body D has a frame portion Dj which follows the shape of a circumferential edge portion 8a of the oil pan 8 and protrudes in a face-to-face relationship with the circumferential edge portion 8a. Female screw parts are provided on the frame portion Dj at predetermined intervals. The circumferential edge portion 8a of the oil pan 8 is formed in a flange-like shape which includes a plane in parallel with the bottom surface of the frame portion Dj, and through holes are provided in accordance with the disposition of the female screw parts of the frame portion Dj to allow bolts Bt as fastening members to be inserted. The oil pan 8 is fastened and secured to the second case body D with the bolts Bt with the circumferential edge portion 8a abutting on the bottom surface of the frame portion Dj through an oil seal. The oil pan 8 has a length to extend in the front-to-rear direction from the neighborhood of a position under the front end opening Da of the second case body D up to a position under the rear end wall portion Db. Thus, the length of the second case body D in the front-to-rear direction (axial direction) is advantageously utilized to provide the oil pan 8 with a sufficient capacity and to accommodate a sufficient space to dispose the hydraulic controller 7.

The hydraulic controller 7 is disposed in the oil chamber 10 which is surrounded by the oil pan 8, the outer wall of the second case body D, and the frame portion Dj. To allow the hydraulic controller 7 to be mounted, a flat part Dk is formed on a bottom surface of the outer wall of the large-diameter part Dg of the second case body D. The hydraulic controller 7 is secured and mounted with a fastening member (such as a bolt Bt) while being abutted on the flat part Dk from below. The hydraulic controller 7 has a top/bottom dual stage configuration including a top stage 7a and a bottom stage 7b. The bottom stage 7b has a length in the front-to-rear direction that is slightly shorter than the length of the oil pan 8 in the front-to-rear direction, and it is formed with a flat top surface. A front part of the top surface of the bottom stage 7b is mounted in abutment on the flat part Dk. The top stage 7a is secured such that it is placed on a rear part of the top surface of the bottom stage 7b. That is, the top stage 7a is disposed in a space under the small-diameter part Dh of the second case body D where the outer diameter is smaller than that of the large-diameter part Dg, the space being therefore retracted in the radial direction.

OTHER MODES FOR CARRYING OUT THE INVENTION (1) The above description of the mode for carrying out the invention has addressed a case in which the vehicle driving device 1 is configured as a split type hybrid vehicle driving device having first and second or two motor generators MG1 and MG2 as electric motors. However, the invention may be applied to hybrid vehicle driving devices configured as types other than the split type including series types and parallel types. Further, the invention may be applied to driving apparatus for various vehicles other than hybrid vehicles such as electric vehicles. Therefore, the invention may be also applied to, for example, a vehicle driving device having only one electric motor.

(2) The above description of the mode for carrying out the invention has addressed a case in which the transmission mechanism 3 has a diameter smaller than that of the second motor generator MG2 and in which the second case body portion D' is formed with an outer diameter rearward of the intermediate wall body 9 smaller than an outer diameter frontward of the intermediate wall body 9. However, the scope of application of the invention is not limited to such a case. Therefore, a preferable mode for carrying out the invention can be provided by, for example, a configuration in which the outer diameters of the second case body portion D' of the second case body D on the front side and rear side of the intermediate wall body 9 are substantially equal. Even in such a configuration, since the axial length of the second case body D is still longer than that in apparatus configurations according to the related art, it is possible to provide a sufficient space for disposing the oil pan 8 and the hydraulic controller 7.

(3) The above description of the mode for carrying out the invention has addressed a case in which the intermediate wall body 9 is secured in abutment on the step portion Df in the second case body D. However, the method for securing the intermediate wall body 9 is not limited to the same. That is, other securing methods may be employed as long as the intermediate wall body 9 can be secured in the middle of the interior of the second case body D when viewed in the front-to-rear direction (axial direction).

(4) The above description of the mode for carrying out the invention has addressed a case in which the body portion 9a of the intermediate wall body 9 is formed in a substantially disc-like shape. However, what is required is that the intermediate wall body 9 has at least the function of supporting the intermediate shaft 13. Therefore, the body portion 9a may have a shape with an opening for establishing communication between the transmission mechanism 3 and the second motor generator MG2, e.g., a shape like a star or cross.

The invention may be preferably used in various types of vehicle driving devices in which a transmission mechanism and an electric motor are housed in a case.

In the present application, the term "electric motor" is used as a concept implying any of a motor generating a rotary driving force from electric power, a generator (electric generator), and a motor generator serving as both motor and generator as the occasion demands.

Figure 4:
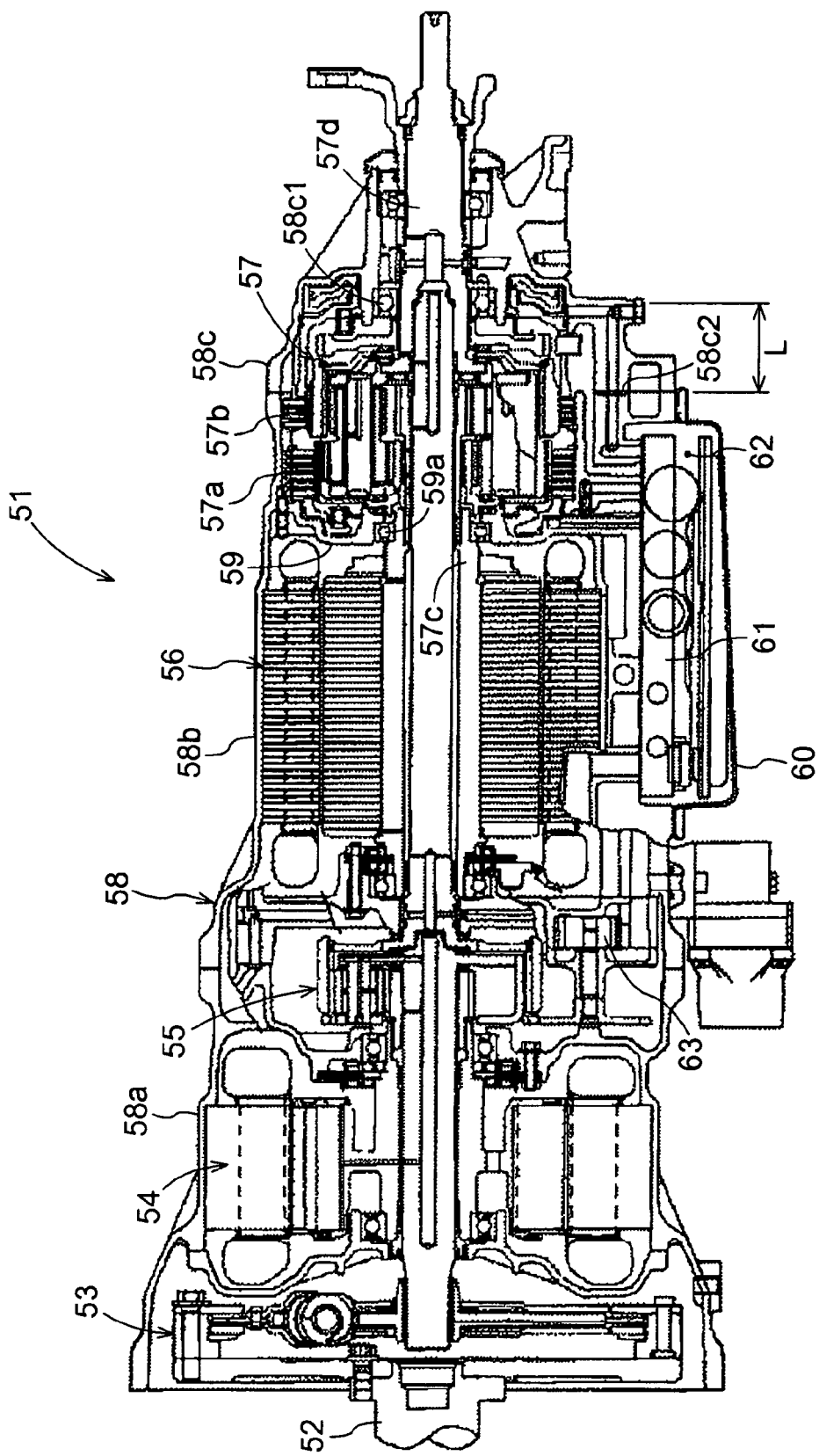
FIG. 4 is a sectional view of a vehicle driving device according to the related art.

In accordance with an exemplary aspect of the invention, since the end wall having the bearing part for supporting the output shaft of the transmission mechanism is provided integrally with the case body, there is no need for mounting a cover member for covering the opening on another end of the case body. Therefore, the oil pan and the hydraulic controller can be disposed in a space extending up to the neighborhood of the end wall on which the bearing part for supporting the output shaft of the transmission mechanism is provided. That is, the space for disposing the oil pan 60 and the hydraulic controller 61 can be made larger than that in apparatus configurations according to the related art by a length equivalent to an axial length L (see FIG. 4) from the bearing part 58c1 of the end cover 58c up to a surface 58c2 of the cover mounted to the second case body 58b while maintaining oil-tightness.

The characteristic configuration also makes it possible to mount both of the transmission mechanism and the electric motor in one direction from one end of the case. Therefore, the ease of the operation of mounting the transmission mechanism and the electric motor can be improved.

In accordance with an exemplary aspect of the invention, the ease of mounting is improved in mounting both of the transmission mechanism and the electric motor in one direction from one end of the case body. Thus, a configuration can be provided, in which the input shaft of the transmission mechanism can be supported by the intermediate wall body between the transmission mechanism and the electric motor.

In accordance with an exemplary aspect of the invention, the transmission mechanism is smaller in diameter than the electric motor, and those elements are mounted in the case body by inserting them from one end of the case body. Thus, the outer diameter of the case body on the side of the another end thereof can be formed in accordance with the outer diameter of the transmission mechanism or smaller than the outer diameter of the side of the one end where the electric motor is housed without reducing the ease of the operation of inserting and mounting the transmission mechanism and the electric motor in the case body. Therefore, the region of the another end of the case body where the transmission mechanism is housed can be formed smaller in the radial direction than the region of the one end. It is therefore possible to expand the space for disposing the hydraulic controller in the radial direction in the region of the another end of the case body.

In accordance with an exemplary aspect of the invention, the intermediate wall body can be mounted in the case body by inserting it from the side of the one end similarly to the transmission mechanism and the electric motor.

In accordance with an exemplary aspect of the invention, oil can be supplied to the transmission mechanism and the electric motor from an intermediate region of the case in the axial direction thereof utilizing the intermediate wall body.

In accordance with an exemplary aspect of the invention, the stator of the electric motor can be easily secured from the side of the one end of the case using a fastening member or the like.

In accordance with an exemplary aspect of the invention, the axial length of the case body can be advantageously utilized to provide the oil pan with a sufficient capacity and to accommodate a sufficient space to dispose the hydraulic controller.

In accordance with an exemplary aspect of the invention, communication can be provided between the oil pump and the hydraulic controller by a relatively short oil channel especially when the hydraulic controller is long in the lengthwise direction of the case body.

The diameter of the transmission mechanism is normally smaller than that of the electric motor. Therefore, in accordance with an exemplary aspect of the invention, it possible to structure the size of the apparatus as a whole in the radial direction such that it is tapered toward the output shaft. The apparatus can therefore be more easily carried by a vehicle.

What is claimed is:

1. A vehicle driving device, comprising:
a case with a case body;
a transmission mechanism having hydraulically controlled frictional engaging devices;
an electric motor housed in the case body; and
a hydraulic controller that controls oil pressure supplied to the frictional engaging devices, with the hydraulic controller disposed on an outer wall of the case body, wherein the case body has:
an opening at one end of the case body that is structured to allow the transmission mechanism and the electric motor to be inserted through the opening and to allow both the transmission mechanism and the electric motor to be mounted in one direction from the one end of the case body, and
an end wall portion, having a bearing part that supports an output shaft of the transmission mechanism, that is provided at another end of the case body integrally with the case body,
wherein the outer wall of the case body is a unified outer wall that has an axial length that extends from approximately the one end of the case body to the another end of the case body.

2. The vehicle driving device according to claim 1, wherein:
an intermediate wall body having a bearing part for supporting an input shaft of the transmission mechanism is secured inside the case body on a side of the one end with respect to the transmission mechanism; and
the electric motor is disposed inside the case body on a side of the one end with respect to the intermediate wall body.

3. The vehicle driving device according to claim 2, wherein:
an outer diameter of the transmission mechanism is smaller than an outer diameter of the electric motor; and
the case body is structured in order to accommodate the outer diameters such that an outer diameter of the case body on the side of the another end with respect to the intermediate wall body is smaller than an outer diameter of the case body on the side of the one end with respect to the intermediate wall body.

4. The vehicle driving device according to claim 2, wherein:
a step portion having a smaller diameter on the side of the one end is formed on an inner wall of the case body; and
the intermediate wall body is secured by being made to abut on a side surface of the step portion from the side of the one end.

5. The vehicle driving device according to claim 2, wherein a first oil channel in communication with the hydraulic controller is formed inside the intermediate wall body.

6. The vehicle driving device according to claim 5, wherein:
an oil pan is mounted under the outer wall of the case body, the oil pan having a length extending from a position under and near the opening at the one end of the case body to a position under and near the end wall portion on the another end, and
the hydraulic controller is disposed in an oil chamber surrounded by the oil pan and the outer wall of the case body.

7. The vehicle driving device according to claim 6, wherein:
an oil pump is disposed on the side of the one end with respect to the electric motor; and
communication is established between the oil pump and the hydraulic controller by a second oil channel provided on the side of the one end of the case body.

8. The vehicle driving device according to claim 5, wherein communication is established between the input shaft and the hydraulic controller by the first oil channel provided in the intermediate wall body.

9. The vehicle driving device according to claim 2, wherein:
a stator securing step portion having a smaller diameter is provided on an inner wall of the case body; and
a stator of the electric motor is secured on a side surface of the stator securing step portion by being made to abut from the side of the one end.

10. The vehicle driving device according to claim 2, wherein:
an oil pan is mounted under the outer wall of the case body, the oil pan having a length extending from a position under and near the opening at the one end of the case body to a position under and near the end wall portion on the another end; and
the hydraulic controller is disposed in an oil chamber surrounded by the oil pan and the outer wall of the case.

11. The vehicle driving device according to claim 10, wherein:
an oil pump is disposed on the side of the one end with respect to the electric motor; and
communication is established between the oil pump and the hydraulic controller by an oil channel provided on the side of the one end of the case body.

12. The vehicle driving device according to claim 2, wherein:
an oil pump is disposed on the side of the one end with respect to the electric motor; and
communication is established between the oil pump and the hydraulic controller by an oil channel provided on the side of the one end of the case body.

13. The vehicle driving device according to claim 2, further comprising:
a first motor generator and a power transfer mechanism, wherein:
the electric motor serves as a second motor generator; and the first motor generator, the power transfer mechanism, the second motor generator, and the transmission mechanism are disposed in order from an engine toward the output shaft.

14. The vehicle driving device according to claim 2, wherein:
the hydraulic controller has a top stage and a bottom stage;
an outer diameter of the transmission mechanism is smaller than an outer diameter of the electric motor;
the case body is structured in order to accommodate the outer diameters such that an outer diameter of the case body on the side of the another end with respect to the intermediate wall body is smaller than an outer diameter of the case body on the side of the one end with respect to the intermediate wall body;
a space exists under the outer diameter of the case body on the side of the another end with respect to the intermediate wall body, the space is retracted in a radial direction and the top stage is placed in the space; and
the bottom stage is placed under the outer wall.

15. The vehicle driving device according to claim 14, wherein the top stage is disposed under the outer wall, at least between the intermediate wall body and the one end of the case body.

16. The vehicle driving device according to claim 1, wherein:
a stator securing step portion having a smaller diameter is provided on an inner wall of the case body; and
a stator of the electric motor is secured on a side surface of the stator securing step portion by being made to abut from the side of the one end.

17. The vehicle driving device according to claim 1, wherein:
an oil pan is mounted under the outer wall of the case body, the oil pan having a length extending from a position under and near the opening at the one end of the case body to a position under and near the end wall portion on the another end; and
the hydraulic controller is disposed in an oil chamber surrounded by the oil pan and the outer wall of the case.

18. The vehicle driving device according to claim 17, wherein:
an oil pump is disposed on the side of the one end with respect to the electric motor; and
communication is established between the oil pump and the hydraulic controller by an oil channel provided on the side of the one end of the case body.

19. The vehicle driving device according to claim 1, wherein:
an oil pump is disposed on the side of the one end with respect to the electric motor; and
communication is established between the oil pump and the hydraulic controller by an oil channel provided on the side of the one end of the case body.

20. The vehicle driving device according to claim 1, further comprising:
a first motor generator and a power transfer mechanism, wherein:
the electric motor serves as a second motor generator; and
the first motor generator, the power transfer mechanism, the second motor generator, and the transmission mechanism are disposed in order from an engine toward the output shaft.

21. The vehicle driving device according to claim 20, wherein the case includes another case body where the first motor generator is inserted.

22. A method of forming a vehicle driving device, comprising:
mounting a transmission mechanism to a case body by inserting the transmission mechanism from an opening at one end of the case body;
mounting an intermediate wall body that supports an input shaft, after mounting the transmission mechanism to the case body, by inserting the intermediate wall body from the opening at the one end of the case body; and
mounting an electric motor, after mounting the intermediate wall body, to the case body by inserting the electric motor from the opening at the one end of the case body, wherein:
both the transmission mechanism and the electric motor are mounted in one direction from the one end of the case body, and
an outer wall of the case body is a unified outer wall that has an axial length that extends from approximately the one end of the case body to another end of the case body.

23. A vehicle driving device, comprising:
a case with a case body;
a transmission mechanism having hydraulically controlled frictional engaging devices;
an electric motor housed in the case body; and
a hydraulic controller that controls oil pressure supplied to the frictional engaging devices, with the hydraulic controller disposed on an outer wall of the case body, wherein the case body has:
an opening at one end of the case body that is structured to allow the transmission mechanism and the electric motor to be inserted through the opening, and
an end wall portion, having a bearing part that supports an output shaft of the transmission mechanism, that is provided at another end of the case body integrally with the case body, wherein:
an intermediate wall body having a bearing part for supporting an input shaft of the transmission mechanism is secured inside the case body on a side of the one end with respect to the transmission mechanism;
the electric motor is disposed inside the case body on a side of the one end with respect to the intermediate wall body;
the hydraulic controller has a top stage and a bottom stage;
an outer diameter of the transmission mechanism is smaller than an outer diameter of the electric motor;
the case body is structured in order to accommodate the outer diameters such that an outer diameter of the case body on the side of the another end with respect to the intermediate wall body is smaller than an outer diameter of the case body on the side of the one end with respect to the intermediate wall body; and
a space exists under the outer diameter of the case body on the side of the another end with respect to the intermediate wall body, the space is retracted in a radial direction and the top stage is placed in the space.

24. The vehicle driving device according to claim 23, wherein the bottom stage is placed under the outer wall.

* * * * *